United States Patent [19]
Brinkley

[11] Patent Number: 4,998,883
[45] Date of Patent: Mar. 12, 1991

[54] EDUCATIONAL TOY

[76] Inventor: Christie Brinkley, Further La., East Hampton, N.Y. 11937

[21] Appl. No.: 321,194

[22] Filed: Mar. 9, 1989

[51] Int. Cl.$^5$ .............................................. G09B 1/00
[52] U.S. Cl. .................................. 434/159; 434/160; 434/170
[58] Field of Search ............... 434/160, 159, 161, 168, 434/170, 172, 176

[56] References Cited

U.S. PATENT DOCUMENTS

| | | | |
|---|---|---|---|
| 218,306 | 8/1879 | McNeil | 434/170 |
| 800,721 | 10/1905 | Coolidge | 434/160 |
| 2,682,118 | 6/1954 | Larsen | 434/160 |
| 2,693,963 | 11/1954 | Moscato | 434/160 X |
| 2,964,858 | 12/1960 | Rutherford | 434/170 |
| 3,075,304 | 1/1963 | Votalato | 434/160 |
| 3,107,436 | 10/1963 | Edwards | 434/168 X |
| 3,721,020 | 3/1973 | Martin | 434/170 |
| 4,344,626 | 8/1982 | Wadland | 434/160 X |
| 4,353,700 | 10/1982 | Volakakis | 434/168 |
| 4,404,764 | 9/1983 | Wills et al. | 434/113 X |
| 4,422,642 | 12/1983 | Fletcher | 434/170 X |
| 4,428,732 | 1/1984 | Meyer | 434/16 |
| 4,478,582 | 10/1984 | Tucker | 434/172 X |
| 4,674,982 | 6/1987 | Mackey | 434/160 X |

FOREIGN PATENT DOCUMENTS

| | | | |
|---|---|---|---|
| 494981 | 6/1919 | France | 434/160 |
| 6601594 | 8/1967 | Netherlands | 434/160 |
| 700095 | 11/1953 | United Kingdom | 434/160 |

Primary Examiner—Richard J. Apley
Assistant Examiner—Rachel M. Healey
Attorney, Agent, or Firm—Schweitzer Cornman & Gross

[57] ABSTRACT

An educational toy for teaching construction and recognition of predetermined individual forms, comprising a plurality of elemental components having shapes and sizes to constitute component parts of predetermined forms, especially letters of the alphabet. A minimum number of distinctively shaped parts can be selectively arranged to make a large number of predetermined forms. Each distinctively shaped part is also distinctively colored to facilitate selection. Illustrations are provided of the several letters or other forms, using the color coding of the elemental components, preferably in the form of individual cards. A dot code is also printed in association with each illustration, to facilitate a determination of the number of parts of each color necessary to make the illustrated form.

2 Claims, 2 Drawing Sheets

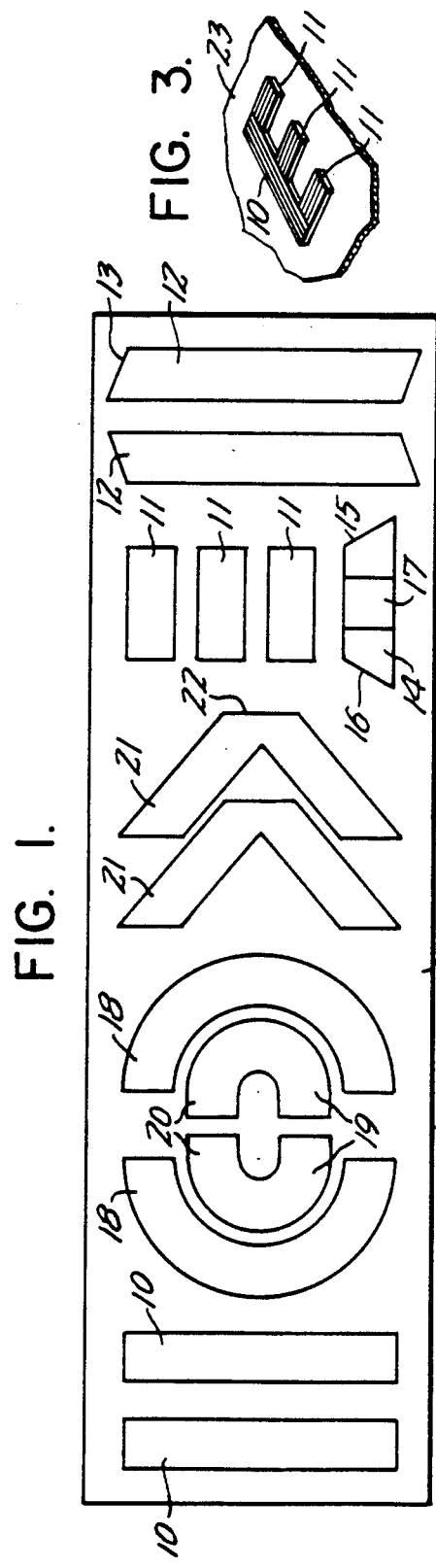
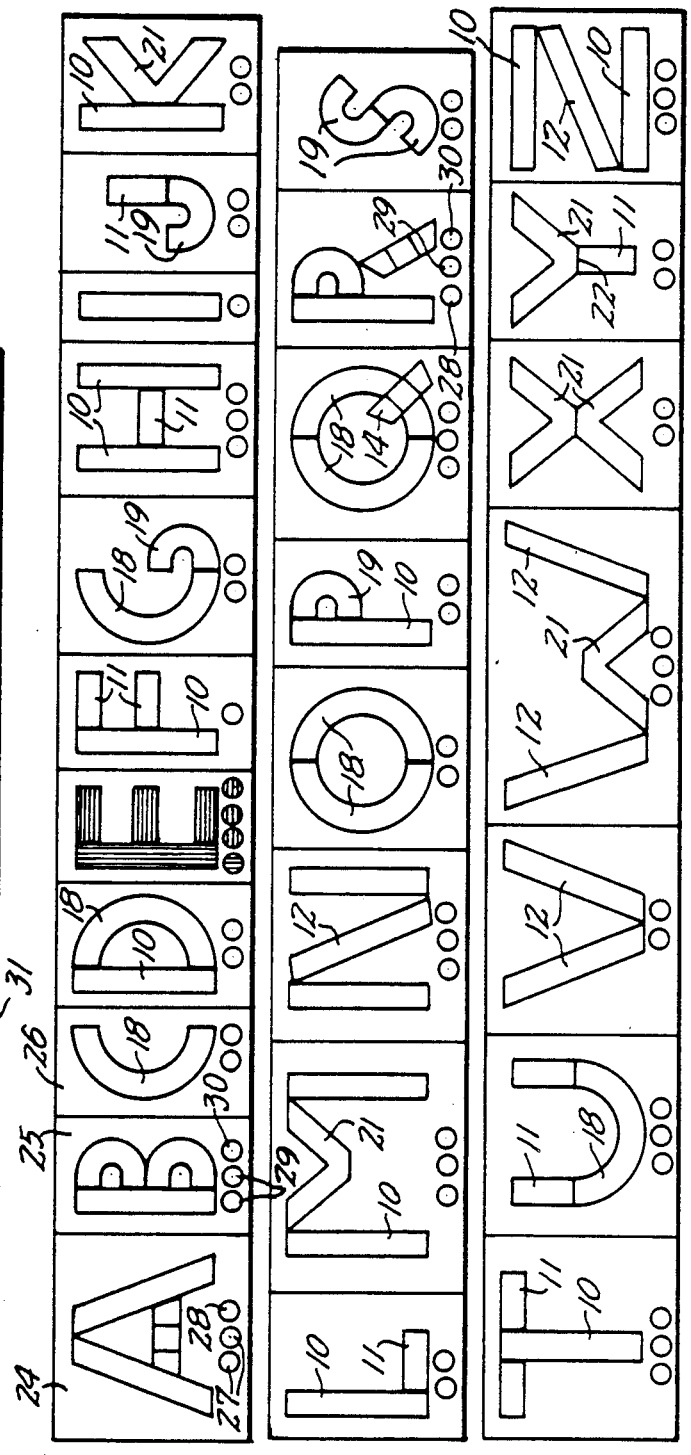
FIG. 1.
FIG. 3.
FIG. 2.

EDUCATIONAL TOY

BACKGROUND AND SUMMARY OF INVENTION

The present invention is directed to educational toys and more particularly to such a toy in the form of a multipiece kit for teaching construction and recognition of predetermined shapes. Although a kit according to the invention may be utilized for teaching recognition and/or construction of almost any series of shapes, it is most advantageously directed toward teaching of letters of the alphabet, and/or numbers for example.

In accordance with the invention, a kit is provided comprising a series of elemental component pieces of predetermined sizes and shapes suitable for assembly in a variety of combinations to form predetermined shapes, especially letters of the alphabet. Each part which differs in size or shape from any other part is formed of a distinctively different color. Similarly, pieces which are identical in size and shape are formed of identical colors.

In a particularly advantageous form of the invention, intended for teaching recognition and construction of letters of the alphabet, a series of only fourteen elemental components, constituting seven distinctly different sizes and/or shapes of parts, are capable of being arranged and organized to form each of the twenty-six letters of the alphabet. By thus limiting the number of elemental components, a child of pre-school age is better able to cope with the management, location and arranging of the parts.

In a preferred form, the individual component elements of the kit are formed of magnetic material and are intended to be assembled and arranged on a board or plate which is also of magnetic material. The individual components may thus be held in arranged positions by a relatively low magnetic force so that the assembly of a multi-part form or letter may be more readily carried out.

Importantly, the educational kit of the invention includes means for illustrating some or all of the various forms that may be created by assembly of the elemental components. Such illustrations, which are most advantageously in the form of individual cards, with one illustration per card, show the desired form as an assembly of the individual components, with each being illustrated in its own distinctive color, so that the child is able to select the necessary components by shape and/or color recognition, or a combination thereof.

To particular advantage, each illustration of a form, capable of creation by assembly of the elemental components, has associated therewith a separate code presentation, referred to herein as a dot code. The dot code is comprised of one or more colored "dots", related to the number and types of elemental components required to make up the illustrated letter or other form. The number of parts of each distinctive color is represented by an equal number of "dots" of that same color. Accordingly, a child may select the appropriate number and type of parts to assemble an illustrated letter exclusively by reference to the dot code, if desired.

In a preferred form of the invention, the kit includes a stow-away board provided with a plurality of individually contoured recesses of a size and shape to receive the various elemental components in a neat, coordinated manner. Desirably, the stow-away board may form part of a hinged carrying case. When closed, the case contains all of the components of the kit. When open, it may provide a magnetic working board and/or a convenient device for display of the illustration cards or the like.

For a more complete understanding of the above and other features and advantages of the invention, reference should be made to the following detailed description of a preferred embodiment of the invention and to the accompanying drawings.

DESCRIPTION OF THE DRAWINGS

FIG. 1 is a top plan view of a stow-away board, shown containing a plurality of elemental components for making up the twenty-six letters of the alphabet.

FIG. 2 is a collective view showing printed illustrations of the letters of the alphabet as formed by arrangement of the elemental components of FIG. 1, and further showing associated dot codes.

FIG. 3 is a fragmentary, perspective view of a board or plate, preferably magnetic, on which a letter has been assembled using selected elemental components of FIG. 1.

DESCRIPTION OF A PREFERRED EMBODIMENT

Figure 5:
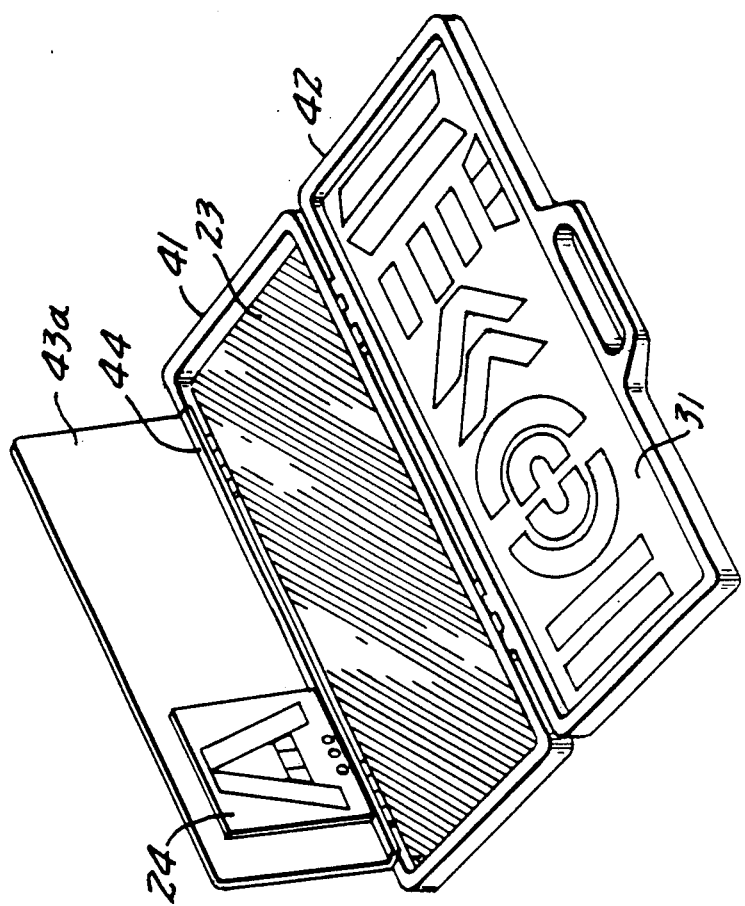
FIG. 5 is a perspective view illustrating the carrying case of FIG. 4 in an open condition, illustrating the incorporation therein of the stow-away board, an assembly board for assembling of the letters or other forms, and a display board for displaying printed illustrations of the forms
Figure 4:
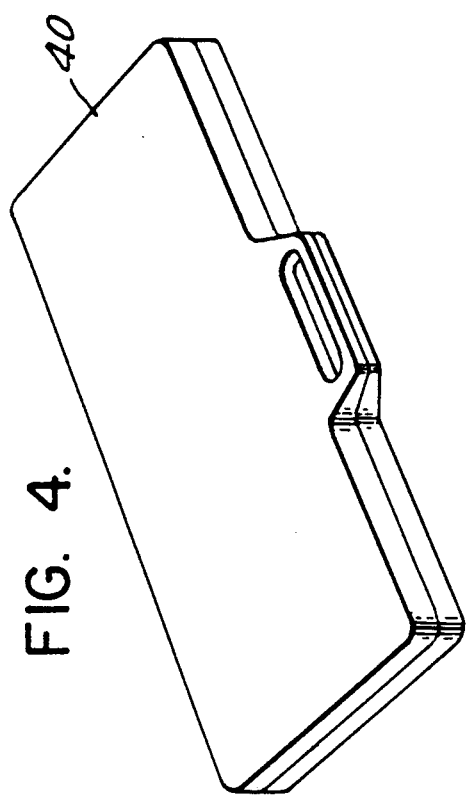
FIG. 4 is a perspective view of an advantageous form of carrying for the component parts of the invention.

Referring now to the drawing, there is shown a kit according to the invention for teaching the construction and recognition of letters of the alphabet. It will be understood, of course, that the basic principles of the invention are applicable to other shapes and forms than letters, but the description will, in general, be limited as a matter of convenience to describing a kit for teaching letters.

Pursuant to the invention, the letters of the alphabet have been broken down into elemental component shapes so that a practical minimum number of parts is necessary to form each of the letters. In the illustrated version of the invention a selection of fourteen elemental parts, of seven different shapes is utilized to form all twenty-six letters. As reflected in FIG. 1, there are two elongated, bar-like elements 10, of identical size and shape and, in accordance with the invention, also identical color. There are, in addition, three short bar-like elements 11, which may advantageously be of the same width as the elongated bar-like elements 10 but perhaps about 60% of their length. It will be understood, of course, 15 that the specific sizes and shapes of the elemental components are in large measure arbitrary and a matter of artistic license, and the specific configurations illustrated and described herein are not to be considered as limiting.

In the illustrated kit, there are also a pair of elongated bar-like elements 12 of parallelogram shape, desirably of the same width as the elements 10, and generally of the same length, but angular at the ends 13 to provide the parallelogram configuration. Still another bar-like element 14 is provided, which is relatively short. The width of the element 14 is similar to the other bar-like elements and its length is generally similar to that of the short bar-like members 11. The ends 15, 16 of the element 14 are angled inwardly and equally, to provide the configuration of an isosceles trapezoid. To advantage, the center portion 17 of the trapezoidal bar 14 is offset upwardly by an amount equalling the thickness of the material of which the various elemental components are formed, so that the bar 14 may be placed in crossing-over relation to another element, as is required in the letter "Q".

In the illustrated kit, two large, generally semicircular elements 18 are provided. The width of the large semi-circular elements in coensistent with that of the bar-like elements, and the outside diameter of the semi-circular elements is equal to the length of the elongated bar-like elements 10. Additionally, there are provided two relatively small, generally semi-circular elements 19. These desirably are provided with short extending legs 20 at each side, so that they may also be described as having the configuration of a short "U". The small semi-circular elements 19 are formed to have an outside diameter of the semi-circular end portions equal to one-half of the diameter of the large semi-circular elements 18.

Completing the inventory of elemental components is a pair of V-shaped elements 21. The surface 22 forming the base of the V-shaped element desirably was a width approximately equal to the width of the bar-like elements 11 to enable those two elements to be combined, with the V-shaped element atop the bar 11, to form the letter "Y".

Pursuant to the invention, each of the distinctively shaped elemental components 10, 11, 12, 14, 18, 19 and 21 is coded with its own distinctively different color, each easily distinguishable from the other. Likewise, all identical parts, such as the two elongated bars 10, are coded with identical colors. To further advantage, the individual elemental components can be formed of a magnetic material, and the kit can be provided with a ferrometal or other magnetic assembly board 23, so that parts placed on the board will be attracted with a low magnetic force and thus will tend to retain their assembled orientation and location against unintended jarring of the board, for example.

As a significant feature of the instructional kit, there are provided printed illustrations of some or all of the various forms (in the instant case, letters) that may be assembled or arranged using one or more of the elemental components. Most desirably, these may be in the form of individual cards, such as illustrated at 24–26 in FIG. 2. Each separate illustration shows an assembly or arrangement of elemental components in the distinctive colors of such components. Accordingly, a child viewing the card 24, illustrating the letter "A", may, through shape recognition alone, select two distinctively colored parallelogram bars 12 and the trapezoidal bar 14. Or he or she may, through color recognition alone, select two parts of the color of the parallelogram bars 12 and a part of the color of the trapezoid bar 14. Or a combination of these recognition faCtors may be employed, depending upon the child's particular capabilities at that stage of his or her development To particular advantage, the instructional kit of the invention may incorporate an additional recognition code, supplemental to the primary color and shape recognition factors provided by illustrations of the individual letters. The additional code, referred to for convenience but without implying limitation as a dot code, accompanies each illustration and provides a secondary input of the number and color of each type of elemental component required to construct the form illustrated. By way of example, it may be assumed that the elemental components are formed with the following color coding:

| Elongated Bars 10 | Red |
| Short bars 11 | Blue |
| Parallelogram Bars 12 | Yellow |
| Trapezoidal Bar 14 | Green |
| Large Semi-Circles 18 | Orange |
| Small Semi-Circles 19 | Purple |
| V-Shaped Elements 21 | Pink |

With such a color scheme the dot coding for the letter "A" would consist of two yellow "dots" 27 and one green "dot" 28. For the letter "B" the coding would consist of two purple "dots" 29 and one red "dot" 30. For the letter "R", the dot coding would consist of one red "dot" 30, one purple "dot" 29, and one Green "dot" 28. The letter "U" would have a dot code of two blue dots and one orange, while "X" would require two pink dots.

Using the dot coding, a child may, as an alternative to the other recognition factors, simply refer to the color scheme of the "dots", in order to retrieve the proper number and color of elemental components for the illustrated part. This provides a highly flexible approach to the problem solving task confronting the child, so that the child may proceed by whichever system can be followed with the greatest facility and/or whichever system suits the child's mood of the moment.

The dot coding need not utilize "dots" of any special shape or form. Typically, the shape of the "dots" is unrelated to the shapes of the elemental components, but one could, of course, utilize different "dot" shapes for different colors if that were deemed desireable.

In the illustrated form of the invention, a stow-away board 31 is provided, which may be of a suitable molded plastic material, for example. The stow-away board is provided with shaped recesses (not identified by reference numerals) for each of the elemental components, so that each component may be stowed away in its particular, close-fitting recess when the kit is put away. Most desirably, the kit may include a closable case, in the nature of a small brief case 40 arranged to hold all of the components of the kit. The case may incorporate the magnetic board 23, as well as means for holding the illustration cards.

The carrying case 40 may advantageously comprise a base 41 and cover 42, joined by hinges 43. In one of the base or cover portions, the stow-away board 31 is secured, while the working board 23 is received within the base portion 41. To advantage, the working board 23, in addition to being formed of a magnetic material to provide a low level of attraction of the elemental component parts may be formed with a black, matte finish, so as to serve additionally as a blackboard surface.

Along the back edge of the open base 41 is a support board 43a, which may be hinged at 44 along the edge of the base, or may simply be inserted in a slot formed therein. In either case, the support board 43a forms a back rest for illustration cards, such as the card 24 shown in FIG. 5, to assist a child in visualizing the construction of a letter being formed on the working board 23.

Figure 7:
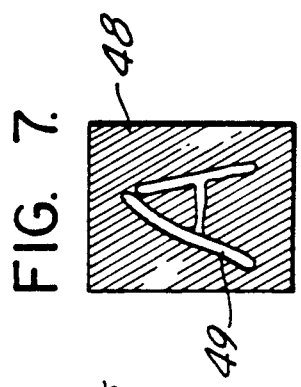
FIG. 7 is a plan view of a representative card illustrating a typical manner in which a specific letter may be drawn on a blackboard, for example.
Figure 6:
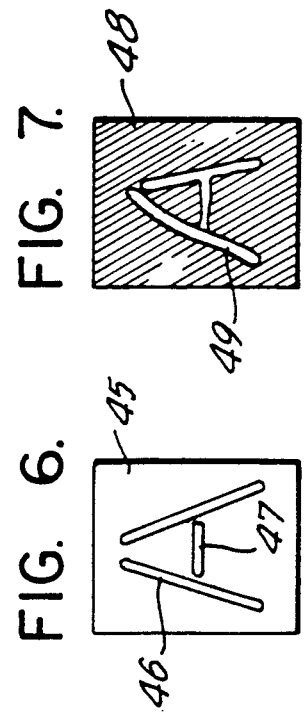
FIG. 6 is an illustrative form of stencil card, which may be utilized in connection with the kit, providing guide ways to assist a child in drawing a particular letter or other form.
Figure 8:
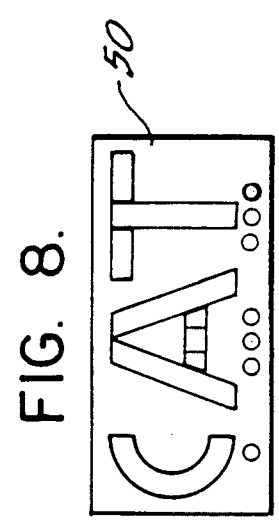
FIG. 8 is a plan view of a simple spelling card, illustrating short words using the constructed letters of the FIG. 2 illustrations, for example.

Advanced versions of the kit may include additional cards of the type shown in FIGS. 6–8. The card 45 shown in FIG. 6 comprises a stencil having a plurality of open slots 46, 47 for receiving the end of a piece of chalk, for example. The stencil card may be placed on the working board 23 and the cutout openings 46, 47 traced to form a letter on the surface of the working board.

In the case of FIG. 7, a card 48 is provided, the surface of which is blackened to imitate the surface of a blackboard. Imprinted on the surface of the card, in relatively rough lines imitating actual hand-drawn lines, is a letter 49. This is calculated to guide the child in duplicating the form of the letter on the working board 23 by copying the line strokes using a piece of chalk or other removable medium.

FIG. 8 illustrates a spelling card 50, which contains a short word made up of individual letters in the same form as shown on the cards of FIG. 2, including the distinctive color coating and, in association with each letter, its distinctive dot coating. At a more advanced level of development, the use of spelling cards can enhance the development of the child in word recognition and spelling. Where spelling cards are utilized it may be necessary or desirable to provide additional numbers of some or all of the elemental components, to assure an adequate inventory of components for the construction of a word consisting of several letters.

It should be understood, of course that the specific forms of the invention herein illustrated and described are intended to be representative only, as certain changes may be made therein without departing from the clear teachings of the disclosure. Accordingly, reference should be made to the following appended claims in determining the full scope of the invention.

We claim:

1. An educational toy for teaching letter construction and recognition, which comprises
   (a) a plurality of elemental components having shapes and sizes to constitute component parts of letters of the alphabet,
   (b) each part having a size or shape different from another part being formed of a distinctly different color,
   (c) all parts of identical size and shape being of the same color,
   (d) means presenting a graphical illustration of each letter formable by one or more of said elemental components of a predetermined number and shape,
   (e) said graphical illustrations each including an illustration of the elemental components in their respective colors, whereby the elemental components necessary for the construction of a letter may be selected on the basis of color recognition as well as shape recognition,
   (f) each of said graphical illustrations including a dot code,
   (g) said dot code being separate from the illustration of the letter and comprising a plurality of individual code elements of a shape unrelated to the shapes of the elemental components but equal in number to the number of elemental components required to form the illustrated letter,
   (h) the individual elements of said dot codes being of colors corresponding to the respective colors of the elemental components for the illustrated letter, whereby the predetermined number and shape of elemental components for an illustrated letter may be selected exclusively by reference to said dot code.

2. An educational toy for teaching construction and recognition of predetermined individual forms comprised of an assembly of elemental shapes, which comprises
   (a) a plurality of elemental components of shapes and sizes to constitute component parts of said predetermined individual forms,
   (b) each part having a size or shape different from another part being formed of a distinctly different color,
   (c) all parts of identical size and shape being of the same color,
   (d) a graphical illustration of each said predetermined individual form capable of being assembled using one or more of said elemental components,
   (e) said graphical illustrations each including an illustration of the elemental components in their respective colors, whereby the elemental components necessary for the construction of the illustrated individual form may be selected on the basis of color recognition as well as shape recognition,
   (f) each of said graphical illustrations including a dot code,
   (g) said dot code being separate from the illustration of the individual form and comprising a plurality of individual code elements of a shape unrelated to the shapes of the elemental components but equal in number to a predetermined number of elemental components required to make the illustrated form,
   (h) the individual elements of said dot codes being of colors corresponding to the respective colors of the elemental components for the illustrated form, whereby the predetermined number and shape of elemental components required for assembly of an illustrated shape may be selected exclusively by reference to said dot code.

* * * * *